United States Patent [19]
Dickenson

[11] Patent Number: 5,889,624
[45] Date of Patent: Mar. 30, 1999

[54] PLUG-IN MIRROR

[75] Inventor: Kenneth H. Dickenson, Bellevue, Wash.

[73] Assignee: Paccar Inc, Bellevue, Wash.

[21] Appl. No.: 641,526

[22] Filed: May 1, 1996

[51] Int. Cl.$^6$ .............................. G02B 7/182; B60R 1/06
[52] U.S. Cl. ........................ 359/841; 359/872; 359/877; 359/512; 248/479; 248/480
[58] Field of Search .................... 359/841, 844, 359/872, 875, 877, 881, 512; 248/477, 479, 480, 481, 486

[56] References Cited

U.S. PATENT DOCUMENTS

| | | |
|---|---|---|
| 1,894,383 | 1/1933 | Smith . |
| 2,926,040 | 2/1960 | Kramer et al. ............................. 296/44 |
| 4,350,084 | 9/1982 | Azzola .................................... 359/844 |
| 4,422,724 | 12/1983 | Otsuka et al. . |
| 4,605,260 | 8/1986 | Sakakibara et al. ..................... 296/201 |
| 4,626,084 | 12/1986 | Kumai . |
| 4,636,045 | 1/1987 | Suzuki .................................... 359/844 |
| 4,824,164 | 4/1989 | Nakayama et al. ..................... 296/146 |
| 4,836,490 | 6/1989 | Mittelhauser et al. .................. 359/841 |
| 4,845,894 | 7/1989 | Herringshaw et al. ................... 49/502 |
| 4,877,319 | 10/1989 | Mittelhauser . |
| 4,913,543 | 4/1990 | Haba et al. ............................. 359/875 |
| 4,973,147 | 11/1990 | Fujita et al. ............................ 359/877 |
| 4,998,814 | 3/1991 | Perry ...................................... 359/872 |
| 5,095,659 | 3/1992 | Benoit et al. ............................. 49/502 |

FOREIGN PATENT DOCUMENTS 3510-780-C1  5/1986  Germany ........................... B60J 5/00

*Primary Examiner*—Ricky D. Shafer
*Attorney, Agent, or Firm*—Seed and Berry LLP

[57] ABSTRACT

A plug-in side mirror assembly removably attachable to a side portion of a vehicle. The mirror assembly includes a mirror housing connected to a top end of a support arm and a male mounting attachment connected to the bottom end of the support arm. A mounting structure in a side portion of a vehicle has a female receiving socket therein. The male mounting attachment is shaped and sized to removably plug into the receiving socket such that the support arm and the mirror housing are supported at a predetermined position adjacent to the side portion of the vehicle. A heater and positioning motor are coupled to the mirror housing, and electrical wires extend from the heater and motor, through the support arm, and terminate at electrical blade connectors adjacent to the male mounting attachment. The mounting structure has electrical connectors coupled to the vehicle's electrical system and positioned within the female receiving socket to removably receive the blade connectors and operatively connect the heater and motor to the vehicle electric system when the male mounting attachment is plugged into the female receiving socket.

16 Claims, 2 Drawing Sheets

PLUG-IN MIRROR

TECHNICAL FIELD

The present invention relates to mirror assemblies, and more particularly to mirror assemblies of motor vehicles.

BACKGROUND OF THE INVENTION

Trucks and automobiles typically have at least one side mounted mirror assembly that is secured to the outer skin of a door or cowl of the vehicle. Proper alignment and installation of the mirror assembly is a time-consuming and labor-intensive process, particularly when installing mirror assemblies on vehicles along an assembly line or the like. After the side mirror assemblies are secured to the outer skin of the door or cowl, the mirror assemblies are sensitive to vibration of the outer skin during operation of the vehicle.

Some of the conventional vehicle side mirror assemblies are motorized units having a positioning motor coupled to a mirror of the assembly for adjustment of the mirror's position relative to the vehicle. Heaters are also incorporated in conventional mirror assemblies for heating and defrosting the mirror. During installation or replacement of the motorized and heated mirror assemblies, electric wiring connected to the vehicle's electrical system must be threaded through the outer skin of the vehicle's door or cowling and attached to the assembly before the mirror assembly is fastened in place. The installation process of connecting the wiring of the motor and the heater to the vehicle's electrical system and subsequently attaching the mirror assembly to the vehicle's outer skin is an additional time-consuming and labor-intensive process which adds to the overall cost of a vehicle being produced.

SUMMARY OF THE INVENTION

The present invention overcomes the drawbacks of the conventional mirror assemblies and provides a plug-in sideview mirror assembly that is securely attachable to a side portion of a vehicle and that allows for easy and quick installation of the mirror assembly on the vehicle. In one embodiment of the present invention, the mirror assembly includes a mirror housing, a support arm having first and second end portions, the first end portion being connected to the mirror housing and the second end portion being connected to a mounting attachment of the assembly. The mounting attachment is removably attached to a mounting structure on the side portion of a vehicle, and the mounting structure defines a receiving socket in the vehicle's side portion. The mounting attachment is a male fitting that is shaped and sized to removably plug into the receiving socket such that the support arm and the mirror housing are supported at a predetermined position adjacent to the side portion of the vehicle. Fasteners extend through the mounting structure and are attached to the mounting attachment to removably retain the mounting attachment within the receiving socket.

In a preferred embodiment, the support arm is a generally hollow member with an interior area, and the mounting attachment has an aperture therein that communicates with the interior area. The mirror assembly includes a motor and a heater, each being attached to the mirror housing and coupled to the mirror. Electrical wires for the motor and heater extend through the interior area of the support arm, through the aperture in the mounting attachment, and terminate at a respective electrical connector adjacent to the mounting attachment. Mating connectors are positioned in the receiving socket of the mounting structure and are operatively connected to the electrical system of the vehicle. Accordingly, the electrical connectors mate with a respective mating connector to operatively connect the motor and heater to the electrical system of the vehicle when the mounting attachment is plugged into the receiving socket.

DETAILED DESCRIPTION OF THE INVENTION

Figure 1:
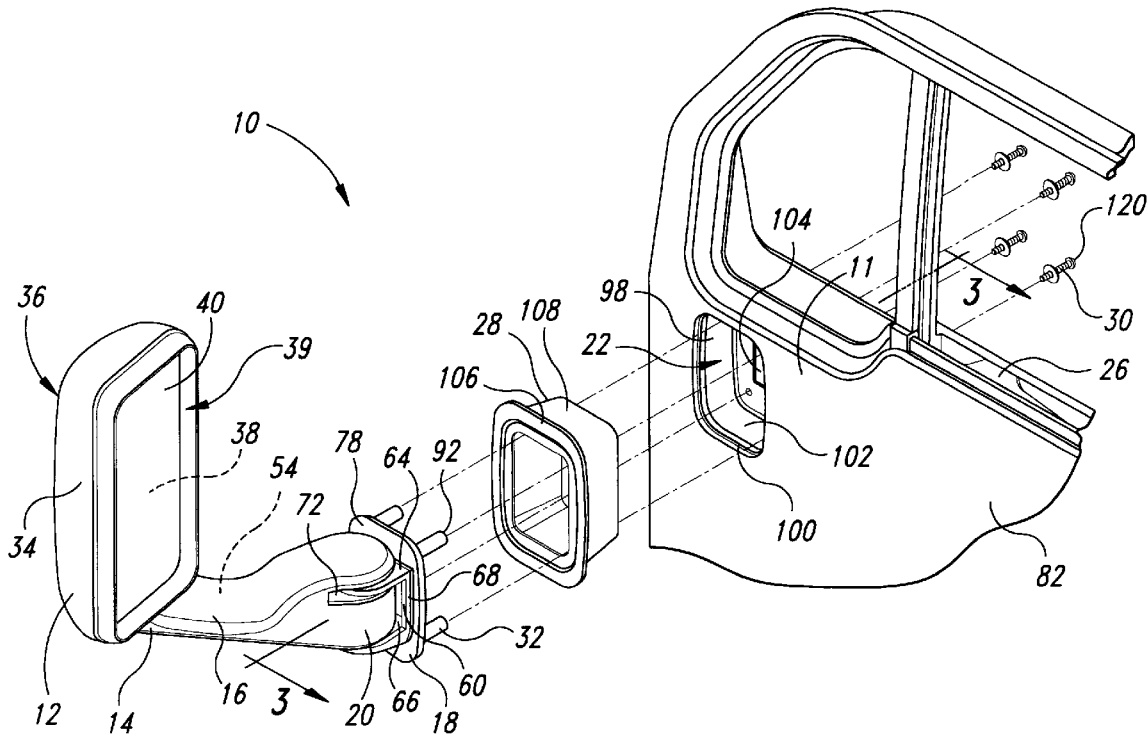
FIG. 1 is a partially exploded isometric view of the plug-in mirror assembly in accordance with the present invention.

A plug-in mirror assembly 10 in accordance with the present invention is shown in the figures for illustrative purposes. The mirror assembly 10 removably plugs into a mounting structure 11 in the frame structure of the door or cowl of a vehicle such that the mirror assembly is securely and quickly mountable and is resistant to vibration from the outer skin of the vehicle. As best seen in FIG. 1, the mirror assembly 10 has a mirror housing 12 mounted on an upper end 14 of a support arm 16, and a plug-in, male mounting attachment 18 is movably connected to a lower end 20 of the support arm. The male mounting attachment 18 is shaped and sized to plug into a female receiving socket 22 formed in the mounting structure 11. The illustrated mounting structure 11 is fixedly connected to the frame of a vehicle door 26 in a forward portion of the door below the window. In an alternate embodiment, the mounting structure 11 is in a portion of the vehicle's cowl.

The male mounting attachment 18 is securely and rigidly retained within the female receiving socket 22 such that the mirror housing 12 and the support arm 16 are in a selected position relative to the door 26. A seal 28 is positioned in the female receiving socket 22, and the seal extends around the male mounting attachment 18 when the mirror assembly 10 is in an installed position. The seal 28 is a resilient member that absorbs vibration and prevents water, dust, dirt, or the like, from passing between the male mounting attachment 18 and the mounting structure 11.

The male mounting attachment 18 includes a plurality of fastener receiving members 32 that extend into the female receiving socket 22 when the mirror assembly 10 is in the installed position. The fastener receiving members 32 removably receive a plurality of fasteners 30 that extend through the door 26 and into the female receiving socket 22 to securely retain the male mounting attachment 18 within the receiving socket.

Figure 2:
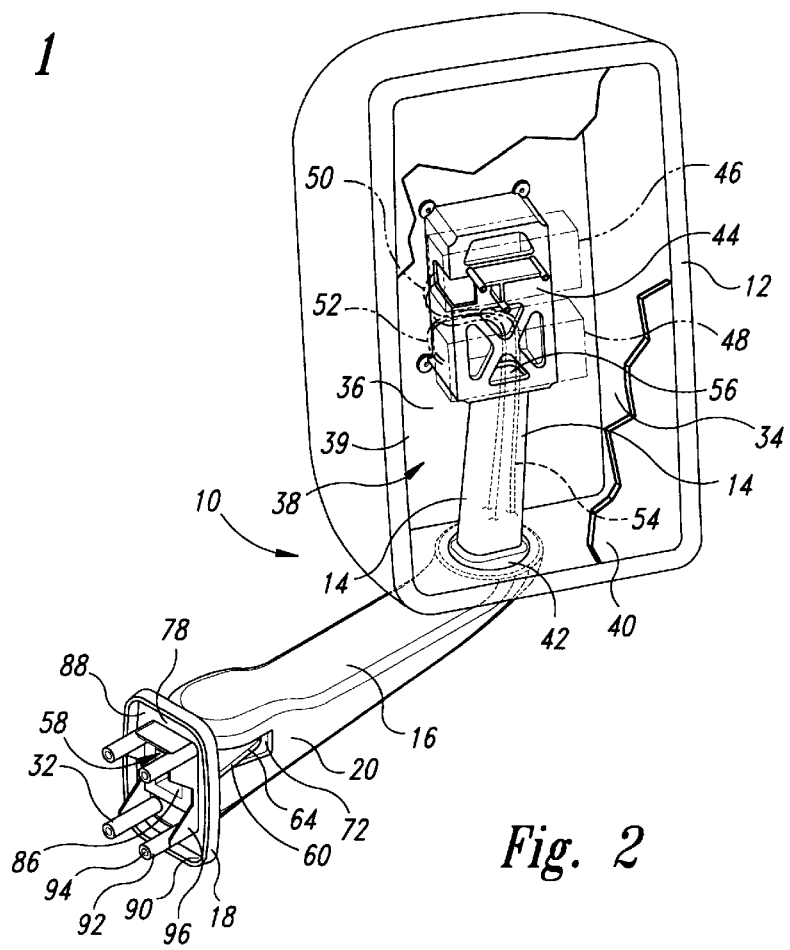
FIG. 2 is an enlarged isometric view of the mirror assembly of FIG. 1 with the mirror partially cut away and the mounting structure and receiving socket not shown.

As best seen in FIGS. 1 and 2, the mirror housing 12 has a plurality of contoured sidewalls 34 that are integrally connected to a contoured back wall 36 to define an interior area 38 of the mirror housing. The mirror housing 12 has an open front side 39 opposite the contoured back wall 36, and a mirror 40 is connected to the mirror housing in a conventional manner so as to span across the open front side, thereby substantially closing out the mirror housing.

The mirror housing 12 has an aperture 42, shown in FIG. 2, in the bottom sidewall 34, and the upper end 14 of the support arm 16 extends upwardly through the aperture. The upper end 14 of the support arm 16 terminates at a mounting bracket 44 which is rigidly fastened to the back wall 36 of the mirror housing 12. The support arm 16 is shaped and contoured to support the mirror housing 12 in a generally vertical orientation such that the mirror 40 defines a generally vertically-oriented plane that is adjustable to facilitate improved visibility for an operator of the vehicle.

The mounting bracket 44 supports a mirror heater 46 that is positioned within the interior area 38 of the mirror housing 12. The mirror heater 46 is fastened to the mounting bracket 44 and coupled in a conventional manner to the mirror 40, as an example, to defrost or defog the mirror when the heater is activated. The heater 46 is an electric heater having wires 50 that extend away from the body of the heater and toward the support arm 16.

The mounting bracket 44 also supports a positioning motor 48 adjacent to the heater 46. The positioning motor 48 is fastened to the mounting bracket 44 and coupled to the mirror 40 in a conventional manner such that the positioning motor changes the angular orientation of the mirror to provide selected visibility to an operator of the vehicle. The positioning motor 48 is an electric motor having wires 52 that extend away from the body of the motor and toward the support arm 16.

The support arm 16 is a substantially hollow member having an interior channel 54, and the interior channel has an upper opening 56 adjacent to the mounting bracket 44 and a bottom opening 58 adjacent to the male mounting attachment 18. The electrical wires 50 of the heater 46 extend from the heater body, into the interior channel's upper opening 56, through the interior channel 54 and out the channel's bottom opening 58. The electrical wires 52 of the positioning motor 48 extend from the body of the motor, into the channel's upper opening 56, through the interior channel 54, and out the channel's bottom opening 58. The electrical wires 50 and 52 each terminate at a respective electrical connector 51 and 53 adjacent to the male mounting attachment 18 such that the electrical wires are substantially contained within the mirror housing 12 and the support arm 16.

Figure 3:
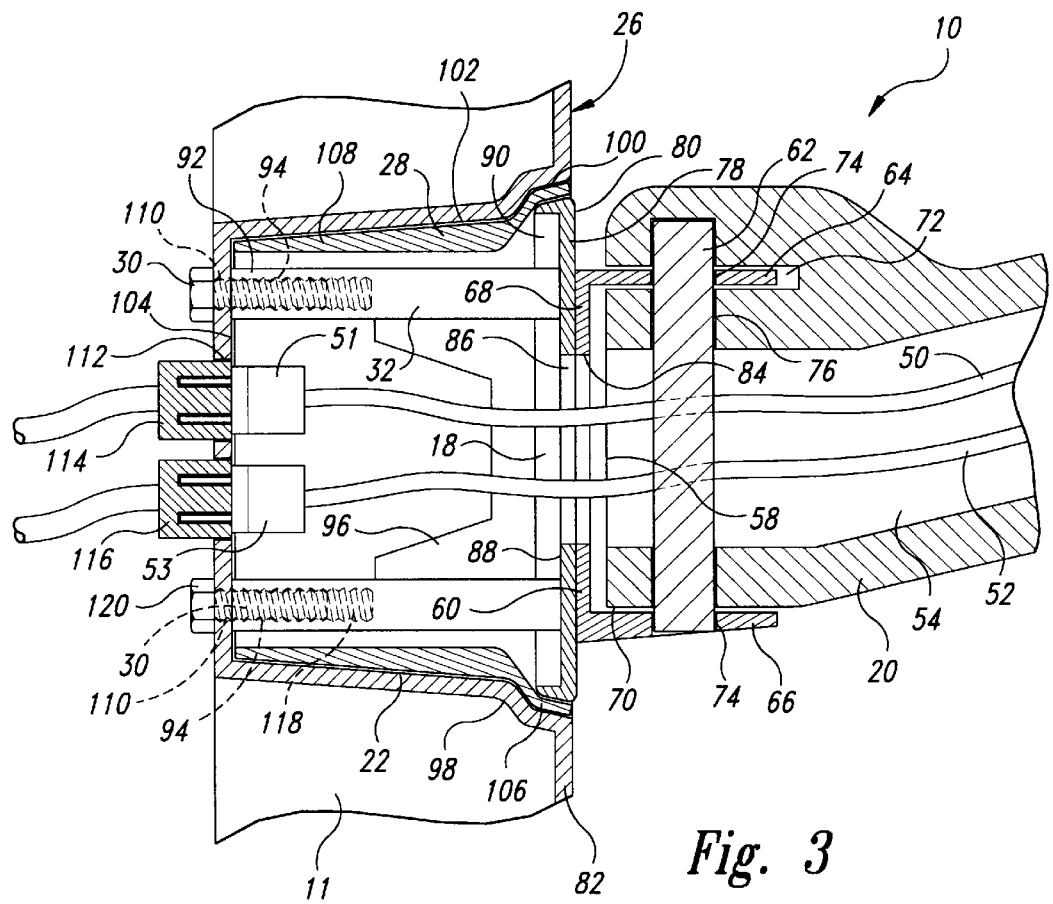
FIG. 3 is an enlarged cross-sectional view taken substantially along the line 3—3 of FIG. 1 showing the male mounting attachment of the mirror assembly positioned within the female receiving socket.

The lower end 20 of the support arm 16 is pivotally connected to the male mounting attachment 18, such that the mirror housing 12 and mirror 40 are movable to a selected position relative to the door 26 (FIG. 1). As best seen in FIG. 3, the male mounting attachment 18 has a U-shaped bracket 60 that is pivotally attached to the lower end 20 of the support arm 16 by a pivot pin 62. The U-shaped bracket 60 has upper and lower flanges 74 and 76 spaced apart from each other and a generally vertical web portion 68 extending between the upper and lower flanges such that the flanges extend horizontally away from the web portion. The lower end 20 of the support arm 16 is positioned partially between the upper and lower flanges 64 and 66, with the lower flange 66 adjacent to a generally flat horizontal bottom surface 70 of the support arm's lower end. The upper flange 64 extends into a substantially horizontal receiving slot 72 in the support arm's lower end 20.

The upper and lower flanges 64 and 66 have coaxially aligned pin apertures 74 that are each coaxially aligned with a receiving aperture 76 in the support arm's lower end 20. The pivot pin 62 extends through the pin apertures 74 and through the receiving aperture 76 to securely and pivotally retain the support arm 16 on the U-shaped bracket 60. Accordingly, the support arm 16 is pivotally attached to the U-shaped bracket 60 for pivotal movement of the support arm 16 and the mirror housing 12 relative to the male mounting attachment 18 and the door 26.

As best seen in FIG. 3, the male mounting attachment 18 has a faceplate 78, and the web 68 of the U-shaped bracket 60 is rigidly fastened to an outer surface 80 of the faceplate. The faceplate 78 is shaped and sized to substantially cover the female receiving socket 22 when the male mounting attachment 18 is in the installed position, such that the outer surface 80 of the faceplate is flush with the outer skin panel 82 of the door 26.

The web 68 of the U-shaped bracket 60 has an access aperture 84 coaxially aligned with an access aperture 86 in the faceplate 78, and the access apertures are aligned with the bottom opening 58 of the support arm's interior channel 54. The wires 50 and 52 from the heater 46 and motor 48 (not shown), respectively, extend out of the interior channel 54 and through the access apertures 84 and 86. The wires from the heater 40 terminate at the upper electrical connector 51. The electrical wires 52 from the motor 48 (not shown) terminate at the lower electrical connector 53. In the preferred embodiment, the upper and lower electrical connectors 51 and 53 are blade connectors, although other electrical connectors are used in alternate embodiments.

Figure 4:
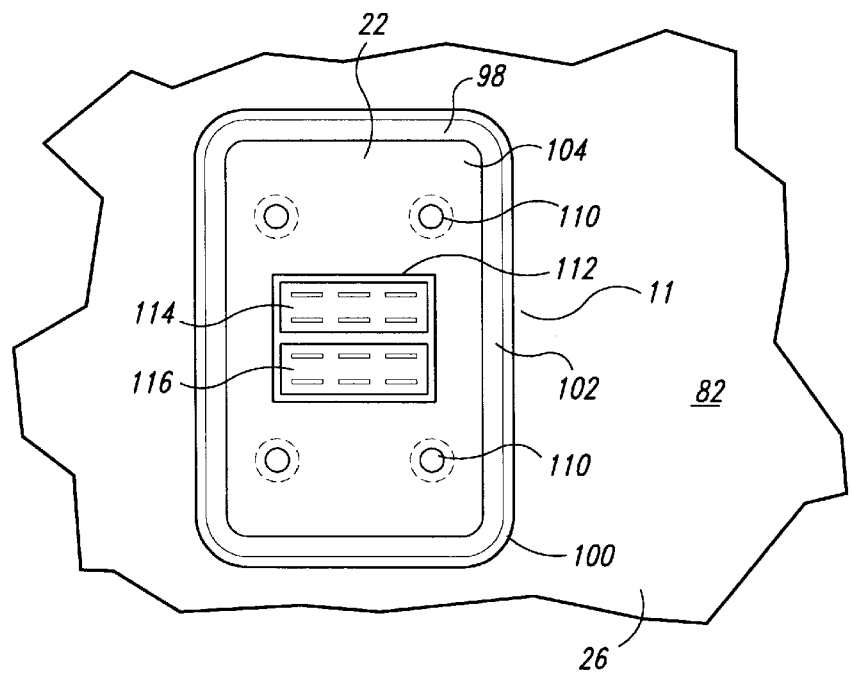
FIG. 4 is an enlarged front elevation view of the mounting structure and female receiving socket of FIG. 1.

As best seen in FIGS. 2 and 4, the faceplate 78 of the male mounting attachment 18 has an inner surface 88 opposite the outer surface 80. The faceplate 78 has an alignment flange 90 attached to the inner surface 88 about the perimeter of the faceplate. When the male mounting attachment 18 is in the installed position, the alignment flange 90 projects perpendicularly away from the inner surface 88 and extends into the female receiving socket 22 around the socket's outermost perimeter. The alignment flange 90 aligns the faceplate 78 and the fastener receiving members 32 within the female receiving socket 22 relative to the mounting structure 24. Proper alignment of the male mounting attachment, and thus the support arm 16 and mirror housing 12 (FIG. 1), is achieved upon plugging the male mounting attachment into the female receiving socket.

The male mounting attachment 18 has four fastener receiving members 32 integrally attached to the inner surface 88 of the faceplate 78, and the fastener receiving member project perpendicularly away from the faceplate. The four fastener receiving members 32 are spaced apart from each other to define a rectangle or sequence pattern. The fastener receiving members 32 are substantially cylindrical members that terminate at free ends 92 opposite the faceplate 78, and each of the fastener receiving members has an internally threaded fastener receiving aperture 94 that is open at the free end.

As best seen in FIG. 2, the mounting attachment 18 has four support rails 96, each extending between a respective pair of the fastener receiving members 32. Each support rail 96 is integrally attached at opposite ends to a respective pair of fastener receiving members 32 such that the four support rails define a generally rectangular pattern with the fastener receiving members at the corners of the rectangle. The support rails 96 interconnect the fastener receiving members 32 and restrict the fastener receiving members from deflecting, for example, during an installation procedure. The support rails 96 project perpendicularly away from the inner surface 88 of the faceplate 78 and extend into the female receiving socket 22 when the male mounting member 18 is in the installed position. The support rails 96 are positioned adjacent to socket sidewalls 98 of the female receiving socket 22. Accordingly, the support rails 96 and fastener receiving members 32 align the male mounting attachment 18 within the female receiving socket 22 to prevent the male mounting attachment from being misaligned during installation into the female receiving socket. As a result, the male mounting attachment 18 and female receiving socket 22 plug-in configuration avoids worker alignment error during the installation of the mirror assembly 10 on the vehicle.

As best seen in FIGS. 1 and 4, the socket sidewalls 98 each have an outer step portion 100 adjacent to the vehicle's skin panel 82, and the outer step portions are shaped and sized to receive the alignment flanges 90 of the male mounting attachment 18. The socket sidewalls 98 each have an inner wall portion 102 that extends away from the respective outer step portion 100 and away from the skin panel 82. When the male mounting attachment 18 is in the installed position, the inner wall portions 102 are interconnected to form a generally rectangular inner area that receives and aligns the support rails 96 and fastener receiving members 32.

The inner wall portions 102 are integrally attached to a rear socket wall 104 that defines the rear portion of the receiving socket 22. The fastener receiving members 32 are sized to project away from the faceplate 78 such that the free ends 92 of the fastener receiving members 32 are immediately adjacent to the rear socket wall 104 when the male mounting attachment 18 is in the installed position.

The resilient seal 28 is positioned within the female receiving socket 22, and is sandwiched between the male mounting attachment 18 and the socket sidewalls 98. The seal 28 has an outer flange portion 106 integrally attached to a generally rectangular body portion 108. The outer flange portion 106 is shaped and sized to sealably engage the outer step portion 100 of the socket sidewalls 98 and to sealably engage the faceplate 78 and the alignment flanges 90 of the male mounting attachment 18. The body portion 108 is sized to sealably engage the inner wall portions 102 of the socket sidewalls 98 when the male mounting member 18 is plugged into the female receiving socket 22. Accordingly, the outer flange portion 106 and the body portion 108 of the seal 28 provides a barrier between socket sidewalls 98 and the male mounting attachment 18 that prevents water, dust, dirt and the like from getting into the female receiving socket 22.

In the preferred embodiment, the seal 28 is a deformable, closed-cell foam member that is removably positioned and adhered onto the male mounting attachment 18 before being plugged into the female receiving socket 22. In alternate embodiments the seal is an elastomeric or rubber seal. In another alternate embodiment (not shown), the seal 28 is integrated into the female receiving socket 22 before the male mounting attachment 18 is plugged into the installed position such that the male mounting attachment is pressed into sealable engagement with the seal. In another alternate embodiment (not shown), the seal 28 is a rectangular, gasket-type seal shaped and sized to engage the faceplate 78, the alignment flanges 90, and the outer step portion 100 of the socket sidewalls 98 so as to form a seal therebetween.

As best seen in FIGS. 3 and 4, the rear socket wall 104 has four fastener apertures 110 each aligned with the fastener aperture 94 in a respective one of the fastener receiving members 32 (FIG. 3) when the mounting attachment 18 is in the installed position. The rear socket wall 104 has a generally rectangular connector aperture 112 in a central portion of the rear socket wall. The connector aperture 112 is in a central portion of the rear socket wall, and is shaped and sized to receive upper and lower electrical connectors 114 and 116, respectively, that are operatively connected to the electrical system of the vehicle.

The upper electrical connector 114 is removably connected to the upper blade connector 51 that is operatively connected to the heater 46 (not shown). The lower electrical connector 116 is removably connected to the lower blade connector 53 that is operatively connected to the motor 48 (not shown). The electrical connectors 114 and 116 are generally flush with the rear socket wall 104, such that the blade connectors 51 and 53 are positioned within the rectangle defined by the fastener receiving members 32 and between the rear socket wall and the faceplate 78 when the male mounting attachment 18 is plugged into the female receiving socket 22.

During installation in the preferred embodiment, the blade connectors 51 and 53 are first plugged into the electrical connectors 114 and 116 in the female receiving socket 22 to provide power to the heater 46 and motor 48, and the male mounting attachment 18 is then plugged into the female receiving socket 22. The fasteners 30 are then screwed into the fastener receiving members 32 to lock the male attachment member 18 in the installed position. The fasteners 30 extend through the fastener apertures 110 in the rear socket wall 104 and into the fastener apertures 94 of the fastener receiving members 32.

The fasteners 30 are threaded fasteners that threadably and removably engage internal threads 118 within the fastener apertures 94, and the heads 120 of the fasteners 30 remain on the far side of the rear socket wall 104 opposite the fastener receiving members 32 upon installation. The fasteners 30 securely hold the fastener receiving members 32 against the rear socket wall 104, such that the male mounting attachment 18 is securely retained in the female receiving socket 22. Accordingly, the male mounting attachment 18 is easily and quickly plugged into the female receiving socket 22. Further, the male mounting attachment 18 is rigidly retained in the mounting structure 24 of the vehicle door 26, thereby providing a substantially rigid mount for the mirror assembly 10 with respect to the vehicle door so the mirror assembly is highly resistant to vibration of the outer skin panel 75 of the door.

While various embodiments have been described in this application for illustrative purposes, the claims are not limited to the embodiments described herein. Equivalent devices may be substituted for those described, which operate according to the principles of the present invention and thus fall within the scope of the claims. Therefore, it is expressly to be understood that the modifications and variations and equivalents thereof made to the plug-in mirror assembly may be practiced while remaining within the spirit and the scope of the invention as defined by the following claims.

I claim:

1. A side-view mirror assembly usable on a vehicle, the vehicle having a side portion, comprising:

a mirror housing;

a support arm connected to said mirror housing;

a mounting structure in the side portion of the vehicle, said mounting structure defining a female receiving socket in the side portion;

a mounting attachment pivotally connected to said support arm, said mounting attachment defining a male fitting that protrudes from said support arm and that is removably positionable in said female receiving socket, said mounting attachment being shaped and sized to removably plug into said receiving socket with said support arm and said mirror housing being movably supported adjacent to the side portion of the vehicle; and fasteners attached to said mounting attachment and removably retaining said mounting attachment within said receiving socket.

2. The mirror assembly of claim 1 wherein said mounting attachment comprises a web member attached to said support arm, and fastener receiving members being connected to said web, each of said fastener receiving members removably receiving a portion of a respective one of said fasteners.

3. The mirror assembly of claim 1 wherein said receiving socket has an opening that receives said mounting attachment, and said mounting attachment includes a web member attached to said support arm and fastener receiving members attached to said web member, said fastener receiving members extending into said receiving socket and said web member generally covering said opening of said receiving socket when said mounting attachment is plugged into said receiving socket.

4. The mirror assembly of claim 1, further comprising an alignment member connected to said mounting attachment and positioned to engage said mounting structure and to align said mounting attachment in said receiving socket.

5. The mirror assembly of claim 1, further comprising a seal positioned between the male mounting attachment and said mounting structure in said female receiving socket.

6. The mirror assembly of claim 1, further comprising a heater mounted in said mirror housing, and said support arm is a hollow member with an interior area, said mounting attachment having an aperture therein that communicates with said interior area, said heater having wires that extend through said interior area of said support arm and through said aperture in said mounting attachment, said wires being connected to a first connector, said mounting structure having a second connector located in said female receiving socket, said first connector being shaped and sized to mate with said second connector when said attachment member is plugged into said receiving socket.

7. The mirror assembly of claim 1, further comprising a motor mounted in said mirror housing, and said support arm is a hollow member with an interior area, said mounting attachment having an aperture therein that communicates with said interior area, said motor having wires that extend through said interior area of said support arm and through said aperture in said mounting attachment, said wires being connected to a first connector, said mounting structure having a second connector located in said receiving socket, said first connector being shaped and sized to mate with said second connector when the male mounting attachment is plugged into said female receiving socket.

8. A side-view mirror assembly usable on a vehicle, the vehicle having a side portion, comprising:
 a mirror housing;
 a support arm connected to said mirror housing;
 a mounting structure in the side portion of the vehicle, said mounting structure defining a female receiving socket in the side portion;
 a mounting attachment connected to said support arm, said support arm being movably attached to said mounting attachment, said mounting attachment defining a male fitting that protrudes from said support arm and that is removably positionable in said female receiving socket, said mounting attachment being shaped and sized to removably plug into said receiving socket with said support arm and said mirror housing being supported adjacent to the side portion of the vehicle; and fasteners attached to said mounting attachment and removably retaining said mounting attachment within said receiving socket.

9. A side-view mirror assembly and a support structure combination usable on a vehicle, comprising:
 a support structure that defines a portion of the vehicle, the support structure having a mirror receiving socket therein having pre-wired electrical connectors, said mirror receiving socket having an interior area and an opening that provides access to the interior area; and
 a mirror assembly securely mounted to said support structure, said mirror assembly including:
  a mirror housing;
  a support arm having first and second portions, said first portion being connected to said mirror housing;
  a mounting attachment connected to said second portion of said support arm and removably connected to said support structure, said mounting attachment being positioned in said interior area of said mirror receiving socket, said mounting attachment being shaped and sized to define a male fitting that removably plugs into the receiving socket of said support structure; and
  a fastener connected to said mounting attachment and securely retaining said mounting attachment in said mirror receiving socket.

10. The mirror assembly and support structure combination of claim 9 wherein said mirror assembly further includes an alignment member connected to said mounting attachment and to said support structure, said alignment member being shaped and sized to align said mounting attachment in a predetermined position within the receiving socket and relative to the support structure.

11. The mirror assembly and support structure combination of claim 10 wherein said alignment member is a resilient sleeve member positioned within said receiving socket and between said mounting attachment and support structure, said resilient sleeve member forming a seal between said mounting attachment and said support structure.

12. The mirror assembly and support structure combination of claim 9 wherein said mounting attachment includes a web member attached to said support arm and a fastener receiving portion connected to said web member and extending away from said web member, said fastener receiving portion being positioned within said receiving socket and engaging said fastener.

13. The mirror assembly and support structure combination of claim 12 wherein said mounting attachment includes a web member attached to said support arm and a fastener receiving portion extending away from said web member and into said mirror receiving socket, said web member being shaped and sized to substantially cover said opening of said mirror receiving socket and to be generally flush with said support structure.

14. The mirror assembly and support structure combination of claim 9, wherein the vehicle has an electrical system and said pre-wired electrical connectors are connected to the electrical system, and said mirror assembly includes a heater mounted in said mirror housing, said heater having wires that are connected at one end to a first connector, said first connector being adjacent to said mounting attachment and connected to one of said pre-wired electrical connectors to operatively connect said heater to the electrical system.

15. The mirror assembly and support structure combination of claim 9, wherein the vehicle has an electrical system and said pre-wired electrical connectors are connected to the electrical system, and said mirror assembly includes a motor mounted in said mirror housing, said motor having wires that are connected at one end to a first connector, said first connector being adjacent to said mounting attachment and connected to one of said pre-wired electrical connectors to operatively connect said motor to the electrical system.

16. The mirror assembly and support structure combination of claim 9 wherein said support structure is a door frame of the vehicle.

* * * * *